US009707645B2

United States Patent
Ozturk et al.

(10) Patent No.: US 9,707,645 B2
(45) Date of Patent: Jul. 18, 2017

(54) SYSTEMS, METHODS, AND APPARATUS FOR LOCATING AND DRILLING CLOSED HOLES OF A TURBINE COMPONENT

(71) Applicant: General Electric Company, Schenectady, NY (US)

(72) Inventors: Yusuf Eren Ozturk, Kocaeli (TR); Selami Haydar Icli, Kocaeli (TR)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 14/151,424

(22) Filed: Jan. 9, 2014

(65) Prior Publication Data
US 2015/0190890 A1    Jul. 9, 2015

(51) Int. Cl.
| B23K 26/382 | (2014.01) |
| B23K 26/03 | (2006.01) |
| B23H 9/10 | (2006.01) |
| B23H 9/14 | (2006.01) |
| B23P 6/00 | (2006.01) |

(Continued)

(52) U.S. Cl.
CPC .............. *B23P 6/002* (2013.01); *B23B 49/00* (2013.01); *B23H 9/10* (2013.01); *B23H 9/14* (2013.01); *B23K 15/0006* (2013.01); *B23K 15/0013* (2013.01); *B23K 15/085* (2013.01); *B23K 26/382* (2015.10); *B26F 1/26* (2013.01); *G05B 19/401* (2013.01); *G05B 19/4099* (2013.01); *B23B 2215/76* (2013.01); *G05B 2219/37205* (2013.01); *G05B 2219/45147* (2013.01);

(Continued)

(58) Field of Classification Search
CPC .. B23H 9/10; B23H 9/14; B23P 6/002; G05B 19/401; G05B 19/4099; G05B 2219/37205; G05B 2219/45147; B23K 26/032; B23K 26/382; B23K 26/384; Y10T 408/03; Y10T 408/05
USPC ....................................... 29/889.721; 382/152
See application file for complete search history.

(56) References Cited

U.S. PATENT DOCUMENTS

| 5,216,808 A | 6/1993 | Martus et al. |
| 6,380,512 B1 | 4/2002 | Emer |

(Continued)

FOREIGN PATENT DOCUMENTS

| EP | 1734429 A1 | 6/2006 |
| EP | 2286956 A1 | 8/2009 |

(Continued)

OTHER PUBLICATIONS

Search Report & Written Opinion for European Application No. 15150305.9 dated Jan. 14, 2016.

*Primary Examiner* — Geoffrey S Evans
(74) *Attorney, Agent, or Firm* — Eversheds-Sutherland (US) LLP

(57) ABSTRACT

Certain embodiments of the disclosure may include systems, methods, and apparatus for locating and drilling closed holes of a gas turbine component. According to an example embodiment, the method can include receiving position data associated with one or more holes in a gas turbine component; receiving predefined hole position data from manufacturing data associated with the gas turbine component; determining at least one missing hole, based at least in part on comparing the received position data to the predefined hole position data; and drilling at least one hole in the gas turbine component corresponding to the determined at least one missing hole.

20 Claims, 3 Drawing Sheets

(51) Int. Cl.
 *B23K 15/00* (2006.01)
 *B23K 15/08* (2006.01)
 *B23B 49/00* (2006.01)
 *B26F 1/26* (2006.01)
 *G05B 19/401* (2006.01)
 *G05B 19/4099* (2006.01)

(52) U.S. Cl.
 CPC ... *G05B 2219/50214* (2013.01); *Y10T 408/03* (2015.01); *Y10T 408/05* (2015.01)

(56) References Cited

U.S. PATENT DOCUMENTS

| | | | |
|---|---|---|---|
| 6,524,395 B1 | 2/2003 | Devine, II | |
| 6,606,541 B2 | 8/2003 | Vaidyanathan | |
| 6,723,951 B1 * | 4/2004 | McGraw | B23K 26/04 219/121.71 |
| 6,847,004 B2 | 1/2005 | Das et al. | |
| 6,909,800 B2 | 6/2005 | Vaidyanathan | |
| 6,909,988 B2 * | 6/2005 | Batzinger | B21O 51/00 451/5 |
| 7,329,832 B2 | 2/2008 | Hoebel et al. | |
| 7,333,218 B2 | 2/2008 | Vaidyanathan | |
| 7,388,980 B2 | 6/2008 | Vaidyanathan | |
| 7,574,035 B2 * | 8/2009 | Koonankeil | F01D 5/005 382/152 |
| 7,725,210 B2 | 5/2010 | Hoebel et al. | |
| 8,218,001 B2 | 7/2012 | Hastilow | |
| 8,373,089 B2 | 2/2013 | Johnson et al. | |
| 8,380,338 B2 | 2/2013 | Miller et al. | |
| 2003/0004606 A1 * | 1/2003 | Duffin | B23B 39/00 700/193 |
| 2004/0228754 A1 * | 11/2004 | Abe | B22F 3/004 419/6 |
| 2006/0104501 A1 * | 5/2006 | Jiang | G01B 21/04 382/152 |
| 2006/0157456 A1 * | 7/2006 | Hoebel | B23K 26/04 219/121.71 |
| 2009/0220349 A1 | 9/2009 | Bolms et al. | |
| 2009/0264768 A1 * | 10/2009 | Courtney | A61B 5/0062 600/463 |
| 2011/0199593 A1 * | 8/2011 | Riepen | G03F 7/70341 355/30 |
| 2012/0179285 A1 * | 7/2012 | Melzer-Jokisch | B23P 6/007 700/164 |
| 2015/0107341 A1 * | 4/2015 | Reid | G01N 27/90 73/112.01 |

FOREIGN PATENT DOCUMENTS

| | | |
|---|---|---|
| NL | 1004975 C6 * | 7/1998 |
| WO | 2012035045 A1 | 3/2012 |
| WO | 2012035060 A1 | 3/2012 |

\* cited by examiner

SYSTEMS, METHODS, AND APPARATUS FOR LOCATING AND DRILLING CLOSED HOLES OF A TURBINE COMPONENT

TECHNICAL FIELD

Embodiments of the disclosure relate generally to repair of a gas turbine component, and in particular, to systems, methods, and apparatus for locating and drilling closed holes of a turbine component.

BACKGROUND

Air cooled components of a gas turbine engine typically require that the cooling airflow is discharged through carefully configured cooling holes. The cooling holes distribute a cooling film over the component surface to increase the effectiveness of the cooling flow. The cooling holes are usually formed by conventional techniques such as laser drilling or electrical discharge machining. During some repair processes material deposition is applied to restore cracks or other defects, and the cooling holes near these repair areas are filled with that filler material. The filled holes may need to be drilled again. In prior methods, an operator manually locates hole positions to be drilled. Accordingly, repair cycle time is very long, because of the locating time of the part for each hole. Also, process accuracy is very low, since an operator is manually locating the part for drilling operation. Further, depending on the operator skill level and experience, drilled hole locations may not agree with the manufacturing tolerance specifications.

BRIEF DESCRIPTION OF THE DISCLOSURE

Some or all of the above needs and/or problems may be addressed by certain embodiments of the disclosure. Certain embodiments of the disclosure can include systems, methods, and apparatus for locating and drilling closed holes of a gas turbine component.

According to an example embodiment of the disclosure, a method can be provided for locating and drilling closed holes in a turbine component. The method can include receiving predefined hole position data from manufacturing data associated with the gas turbine component; determining at least one missing hole, based at least in part on comparing the received position data to the predefined hole position data; and drilling at least one hole in the gas turbine component corresponding to the determined at least one missing hole.

According to another example embodiment, a system can be provided to locate and drill closed holes in a turbine component. The system can include an inspection device for acquiring hole position data for the gas turbine component; a drilling device for removing material from the gas turbine component corresponding to the determined at least one missing hole; a multi-axial manipulator device for positioning a gas turbine component, an inspection device or a drilling device; and at least one processor configured to: receive position data associated with one or more holes in a gas turbine component; receive predefined hole position data from manufacturing data associated with the gas turbine component; and determine at least one missing hole, based at least in part on comparing the received position data to the predefined hole position data.

According to another example embodiment, an apparatus can be provided for locating and drilling closed holes in a turbine component. The apparatus can include one or more processors and at least one memory module configured to receive position data associated with one or more holes in a gas turbine component using an inspection device; receive predefined hole position data from manufacturing data associated with the gas turbine component; determine at least one missing hole, based at least in part on comparing the received position data to the predefined hole position data; position an inspection device or a drilling device using a multi-axial manipulator device configured to manipulate either or both the inspection device and drilling device with respect to a local coordinate system; and drill at least one hole in the gas turbine component corresponding to the determined at least one missing hole.

Other embodiments, features, and aspects of the disclosure are described in detail herein and are considered a part of the claimed disclosure. Other embodiments, features, and aspects can be understood with reference to the following detailed description, accompanying drawings and claims.

BRIEF DESCRIPTION OF THE DRAWINGS

The detailed description is set forth with reference to the accompanying drawings, which are not necessarily drawn to scale.

DETAILED DESCRIPTION OF THE DISCLOSURE

Illustrative embodiments of the disclosure will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

Certain embodiments of the disclosure can include systems, methods, and apparatus for locating and drilling closed holes in a turbine component. One technical effect of certain embodiments of the disclosure provides a system that can be fully automated, wherein component symmetry or manufacturing data can be used to reduce hole determination analysis. In addition, process repeatability can be increased or otherwise maximized due to process automation and using manufacturing data. Cycle time between repairs can also be reduced with the relatively high speed of automation and use of a laser drilling process.

The term "drill" used herein can include drilling an original hole in a component, or re-drilling a hole in a component where the hole has been previously filled or otherwise closed by a process, material and/or means.

Figure 1:
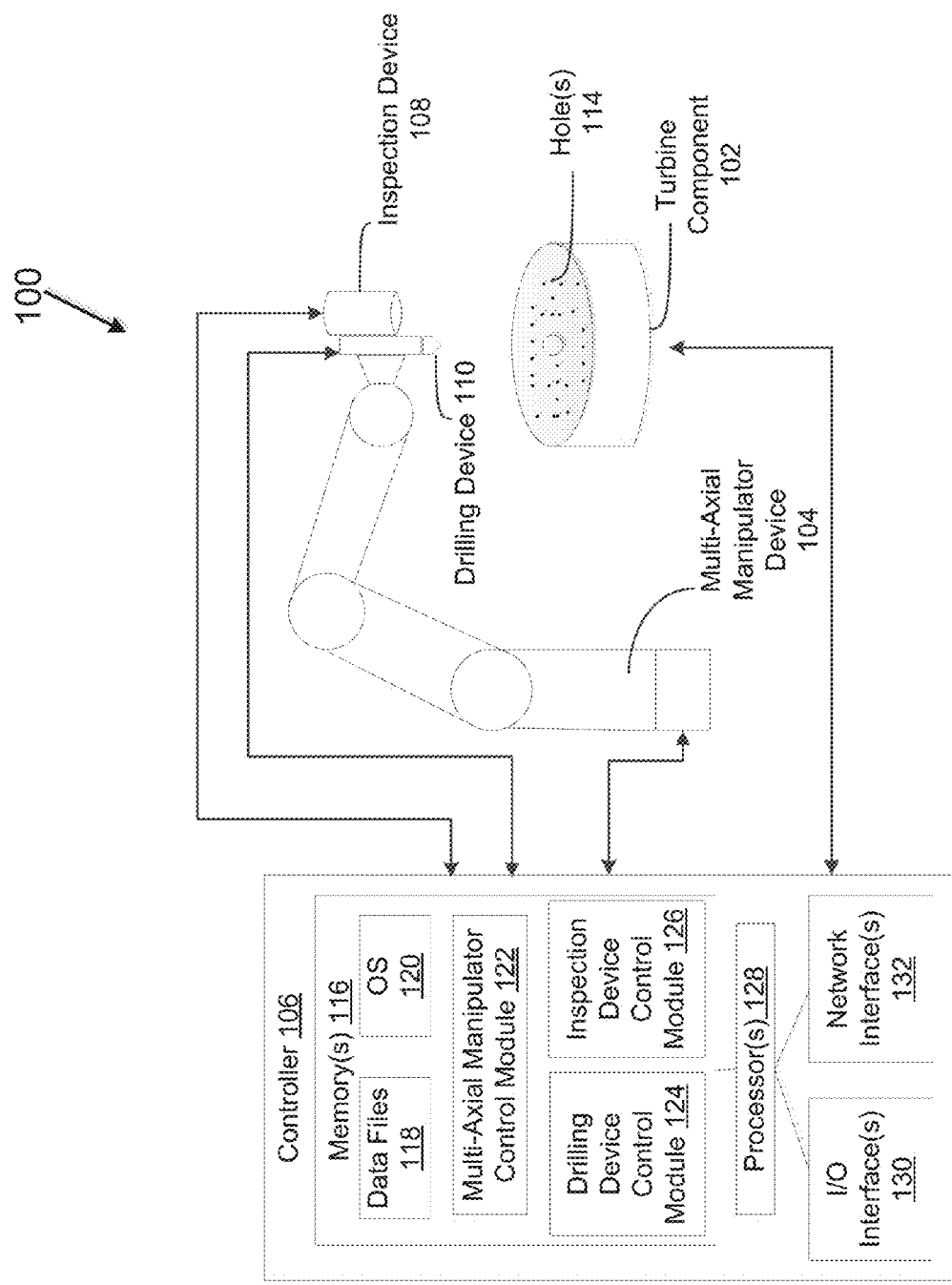
FIG. 1 is a schematic block diagram illustrating an example system for locating and drilling closed holes according to an embodiment of the disclosure.

Referring now to the figures, where the various numbers represent like elements through the several views, FIG. 1 is a schematic illustrating an example gas turbine component repair system 100 deployed in an environment. FIG. 1 illustrates the system 100 or apparatus operating with respect to a turbine component 102. The system 100 can include a multi-axial manipulator device 104, at least one controller 106, an inspection device 108, and a drilling device 110, in accordance with an embodiment of the disclosure.

As illustrated in FIG. 1, the existence and location of one or more holes 114 in the turbine component 102 can be viewed using an inspection device 108. In one embodiment, the inspection device 108 can be a vision system such as a camera. Accordingly, the image taken from the camera system can be analyzed with accompanying software to determine hole location.

The system 100 or apparatus may also include a drilling device 110. To drill multiple cooling holes, the drilling device can have suitable precision to produce holes with dimensions in accordance with the manufacturing data. In various embodiments, the drilling device 110 can include one or more subsystems that operate by laser drilling, mechanical drilling, electron beam drilling, waterjet and/or electron discharge machining drilling.

The system 100 can include a multi-axial manipulator device 104. As shown in FIG. 1, the inspection device 108 and drilling device 110 can be attached to the multi-axial manipulator device 104. In one embodiment, the dual alignment of the inspection device 108 and drilling device 110 can allow for more efficient drilling and determination of hole location, using the data received from the inspection device 108. In one embodiment, the multi-axial manipulator device 104 can have multiple degrees of freedom to precisely maneuver the inspection device 108 and drilling device 110 with respect to the orientation of the turbine component 102. In another embodiment, the turbine component 102 may be affixed to a table, wherein the table may be mechanized with sufficient degrees of freedom to move in conjunction with the multi-axial manipulator device 104.

The system 100 can also include at least one controller 106 or suitable control system. At least one controller 106 can be operable to control a system to locate and drill a turbine component. For example, a plurality of connections may facilitate communications between the controller 106 and one or more sensors associated with the inspection device 108, drilling device 110 and/or multi-axial manipulator device 104. A wide variety of suitable connections may be utilized to facilitate communication with the devices (104, 108 and 110), for example, direct network connections, local area network connections, wide area network connections, Internet connections, Bluetooth™ enabled connections (trademark owned by BLUETOOTH SIG, INC.), radio frequency network connections, cellular network connections, any suitable wired connections, any suitable wireless connections, and/or any suitable combinations of connections.

With continued reference to FIG. 1, at least one controller 106 can be a suitable processor driven device that is capable of locating and drilling turbine hole components. Examples of suitable controllers can include, but are not limited to, application specific circuits, microcontrollers, minicomputers, personal computers, servers, other computing devices and the like. The controller 106 may include any number of processors, such as 128, that facilitate the execution of computer-readable instructions to control the operations of the controller 106.

In addition to one or more processors 128, the controller 106 may include one or more memory devices 116, one or more input/output (I/O) interfaces 130, and one or more network interfaces 132. The one or more memory devices 116 or memories may be any suitable memory devices, for example, caches, read-only memory devices, random access memory devices, magnetic storage devices, etc. The one or more memory devices 116 may store data, executable instructions, and/or various program modules utilized by the controller 106, for example, data files 118 and an operating system (OS) 120. The data files 118 may include stored data associated with the operation of the machine and stored data associated with the system 100. In certain embodiments, the data files 118 can include manufacturing data associated with a turbine component, such as 102.

In certain embodiments of the disclosure, the controller 106 may include any number of software applications that are executed to facilitate the operations of the controller 106. The software applications may include computer-readable instructions that are executable by the one or more processors 128. The execution of the computer-readable instructions may form a special purpose computer that facilitates locating and drilling closed holes of a turbine component. As an example of a software application, the controller 106 may include an operating system 120 that controls the general operation of the controller 106 and that facilitates the execution of additional software applications. The controller 106 can include a drilling device control module 124 that is operable to determine the location and operational parameters of the drilling device. Further, the controller 106 can include an inspection device control module 126 that is operable to control the type of inspection and the operational parameters of the inspection device 108. Also, the controller 106 can include a multi-axial manipulator control module 122 that is operable to control the movements of the multi-axial manipulator module. In another embodiment, the one or more processors 128 can be configured to operate a computer numerical control (CNC) machine.

The one or more I/O interfaces 130 may facilitate communication between at least one controller 106, system devices such as drilling devices, inspection devices and other elements, and one or more input/output devices, for example, a universal serial bus port, a serial port, a disk drive, a CD-ROM drive, and/or one or more user interface devices, such as a display, keyboard, keypad, mouse, control panel, touch screen display, micro-phone, etc., that facilitate user interaction with the controller 106. The one or more I/O interfaces 130 may be utilized to receive or collect data and/or user instructions from a wide variety of input devices. Received data may be processed by the controller 106 as desired in various embodiments of the disclosure and/or stored in the one or more memory devices 116.

As desired, embodiments of the disclosure may include a system with more or less than the components illustrated in FIG. 1. Additionally, certain components of the system 100 may be combined in various embodiments of the disclosure. The example system 100 shown in FIG. 1 is provided by way of example only. Numerous other operating environments, system architectures, and device configurations are possible. Accordingly, embodiments of the disclosure should not be construed as being limited to any particular operating environment, system architecture, or device configuration.

Figure 2:
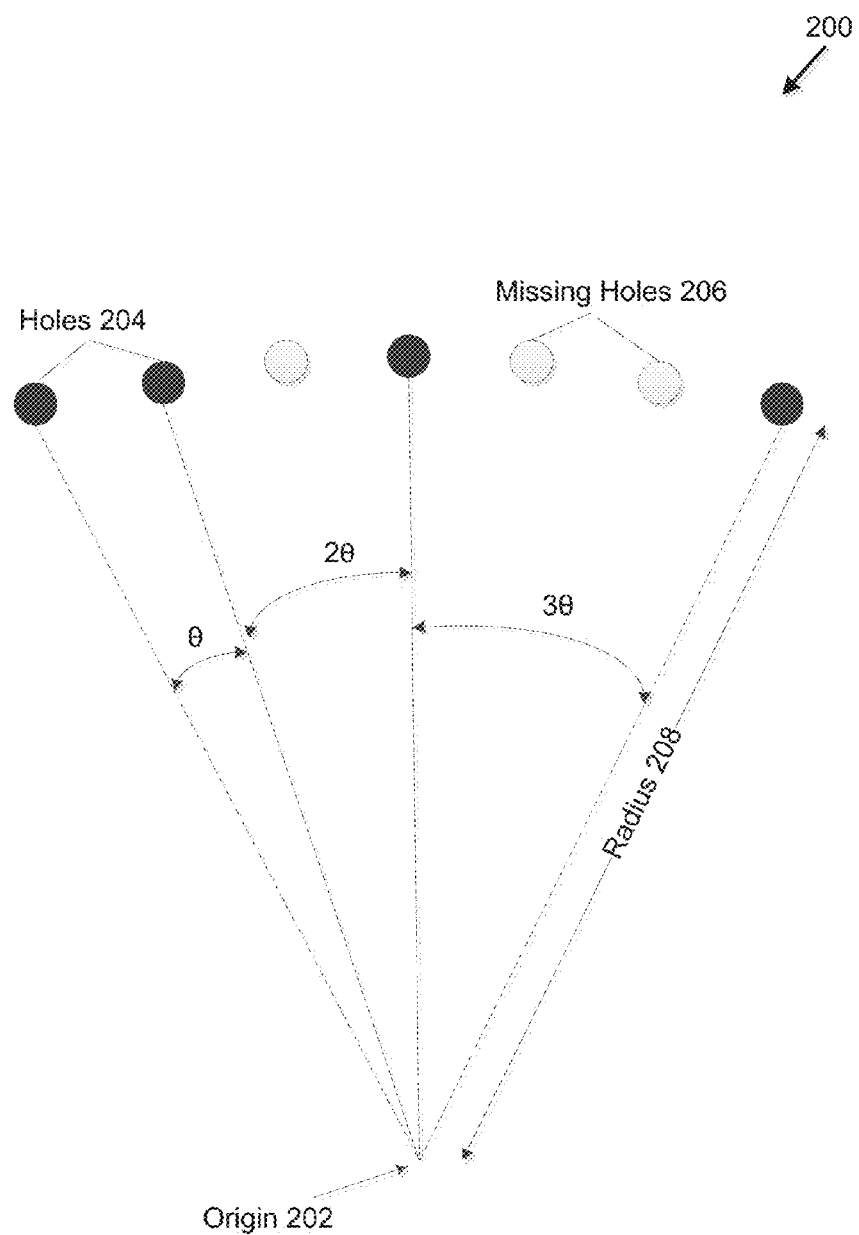
FIG. 2 is a schematic of an example hole position determination according to an embodiment of the disclosure.

FIG. 2 is an example embodiment of a hole orientation layout 200 for hole determination using the locating and drilling algorithm. In one embodiment, an inspection device, such as 108 in FIG. 1, can initiate capture of an image. Each hole location may be iteratively determined by scanning the data provided by the inspection device 108 for differences between image characteristics consistent with the turbine component and those consistent with a hole. For example, when the inspection device 108 is a camera, the existence of a hole may be defined as a percentage difference between two adjoining pixels in the image.

The hole existence determined by scanning the data from the inspection device 108 can be compared to previously stored manufacturing data for a turbine component, such as 102 in FIG. 1. In one embodiment, the hole comparison can be initiated by establishing a local coordinate system and an origin point 202 on the turbine component. The location of each hole 204 can be classified based on a polar coordinate system, wherein each hole 204 is a radial distance 208 from the established origin point 202. The algorithm can compare the distances 206 and angles (θ) between consecutive holes determined from the image with the hole pattern from the turbine component manufacturing data; the comparison result would yield a determination of a missing hole 206. In other embodiments, the algorithm will verify that the determined missing holes 206 are holes that do not exist according to the manufacturing data. In another embodiments, the algorithm can perform additional tasks including: determining outlier holes relative to a locally established geometry; and saving hole comparisons for future analysis when comparing turbine components.

In certain embodiments, the algorithm may initiate the hole determination by inspecting only a portion of the turbine component 102. As a part of this embodiment, the controlling algorithm can subdivide the turbine component 102 into multiple sections. These sections may be determined by establishing the geometric symmetry of the turbine component 102 or predefined sections established from the manufacturing data. Once the hole locations have been determined and drilled according to the manufacturing data, the algorithm can move the multi-axial manipulator device, such as 104 in FIG. 1, to the subsequent section. This process can be continued until all holes in the sections of the turbine component have been determined and drilled.

Figure 3:
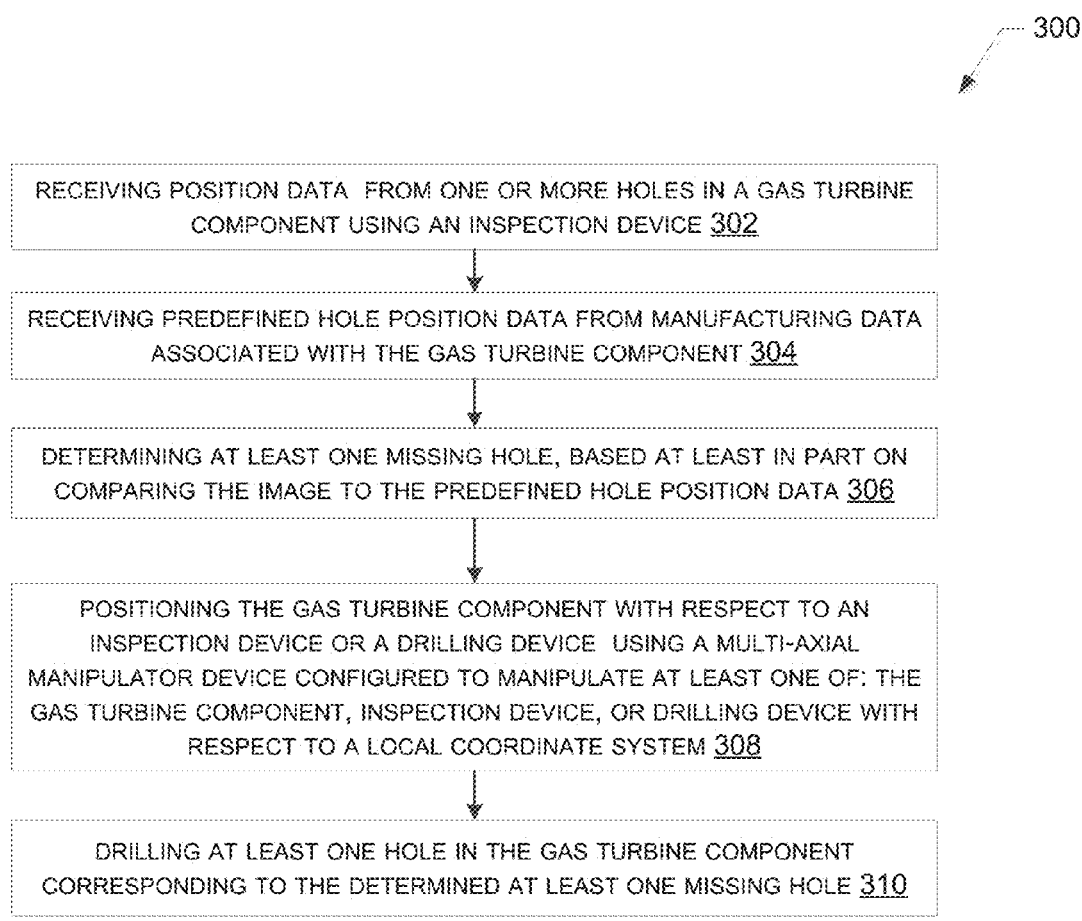
FIG. 3 is a flow diagram for illustrating an example method for locating and drilling closed holes of a gas turbine component.

FIG. 3 is a flow diagram for illustrating an example method for locating and drilling closed holes of a gas turbine component. The method 300 can be implemented using a system, such as 100 in FIG. 1. The operations described and shown in the method 300 of FIG. 3 may be carried out or performed in any suitable order as desired in various embodiments of the disclosure. Additionally, in certain embodiments, at least a portion of the operations may be carried out in parallel. The method 300 can start in block 302, and can include receiving position data associated with one or more holes in a gas turbine component, such as 102 in FIG. 1, using an inspection device. In block 304, the method 300 can include receiving predefined hole position data from manufacturing data, such as 118, associated with the gas turbine component 102. In block 306, the method 300 can include determining at least one missing hole, based at least in part on comparing the received position data to the predefined hole position data. In block 308, the method 300 can include positioning a gas turbine component 102, with respect to an inspection device 108 or a drilling device 110 using a multi-axial manipulator device 104 configured to manipulate at least one of: the gas turbine component 102, the inspection device 108, or the drilling device 110 with respect to a local coordinate system. In block 310, the method 300 can include drilling at least one hole in the gas turbine component 102 corresponding to the determined at least one missing hole.

In one embodiment, receiving position data associated with one or more holes in a gas turbine component can include receiving position data from at least one of a camera, a detection device, or an imaging device. In certain embodiments, receiving predefined hole position data from manufacturing data associated with the gas turbine component can include receiving or accessing previously stored manufacturing data associated with the gas turbine component.

In one embodiment, the gas turbine component can include a repaired gas turbine component with one or more holes comprising material deposition filling, obscuring or covering the one or more holes. In another embodiment, the method can include determining at least one missing hole further comprising using at least one algorithm to determine hole positions in the gas turbine component.

In one embodiment, drilling at least one hole in the gas turbine component corresponding to the at least one missing hole can be repeated until all determined missing hole locations in the gas turbine component have been drilled. In another embodiment, drilling at least one hole in the gas turbine component corresponding to the at least one missing hole can include using at least one of: laser drilling, mechanical drilling, electron beam drilling, or waterjet or electron discharge machining drilling. In other example embodiments of the disclosure, the method 300 can include fewer or greater numbers of operations than those described above, and may be performed in a different sequential order than described above.

The disclosure is described above with reference to block and flow diagrams of systems, methods, apparatus, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the disclosure has been described in connection with what is presently considered to be the most practical of various embodiments, it is to be understood that the disclosure is not to be limited to the disclosed embodiments, but on the contrary, is intended to cover various modifications and equivalent arrangements included within the spirit and scope of the appended claims.

This written description uses examples to disclose the disclosure, including the best mode, and also to enable any person skilled in the art to practice the disclosure, including making and using any devices or systems and performing any incorporated methods. The patentable scope of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention can include:

1. A method to locate and drill a gas turbine component, the method comprising:
    receiving position data associated with one or more holes in a gas turbine component;
    receiving predefined hole position data from manufacturing data associated with the gas turbine component;
    determining at least one missing hole, based at least in part on the received position data and the predefined hole position data, wherein determining the at least one missing hole comprises: (i) determining an angle between consecutive holes with respect to an origin point on the gas turbine component, and (ii) determining the at least one missing hole if the angle between the one or more holes with respect to the origin point is greater than the angle between the consecutive holes; and
    drilling at least one hole in the gas turbine component corresponding to the determined at least one missing hole.

2. The method of claim 1, wherein the gas turbine component comprises a repaired gas turbine component with one or more holes comprising material deposition filling, obscuring, or covering the one or more holes.

3. The method of claim 1, further comprising positioning a gas turbine component, an inspection device or a drilling device using a multi-axial manipulator device configured to manipulate at least one of: the gas turbine component, the inspection device or the drilling device with respect to a local coordinate system.

4. The method of claim 1, wherein receiving position data associated with one or more holes in a gas turbine component comprises receiving position data from at least one of a camera, a detection device, or an imaging device.

5. The method of claim 1, wherein receiving predefined hole position data from manufacturing data associated with the gas turbine component comprises receiving or accessing previously stored manufacturing data associated with the gas turbine component.

6. The method of claim 1, wherein determining at least one missing hole further comprises using at least one algorithm to determine hole positions in the gas turbine component.

7. The method of claim 1, wherein drilling at least one hole in the gas turbine component corresponding to the at least one missing hole is repeated until all determined missing hole locations in the gas turbine component have been drilled.

8. The method of claim 1, wherein drilling at least one hole in the gas turbine component corresponding to the at least one missing hole further comprises using at least one of: laser drilling, mechanical drilling, electron beam drilling, or waterjet or electron discharge machining drilling.

9. A system for locating and drilling a gas turbine component, the system comprising:
    an inspection device for acquiring hole position data for the gas turbine component;
    a drilling device for removing material from the gas turbine component corresponding to the determined at least one missing hole;
    a multi-axial manipulator device for positioning a gas turbine component, an inspection device or a drilling device; and
    at least one processor configured to:
        receive, from the inspection device, position data associated with one or more holes in a gas turbine component;
        receive predefined hole position data from manufacturing data associated with the gas turbine component; and
        determine at least one missing hole, based at least in part on the received position data and the predefined hole position data, wherein determining the at least one missing hole comprises: (i) determining an angle between consecutive holes with respect to an origin point on the gas turbine component, and (ii) determining the at least one missing hole if the angle between the one or more holes with respect to the origin point is greater than the angle between the consecutive holes.

10. The system of claim 9, wherein the gas turbine component comprises a repaired gas turbine component with one or more holes comprising material deposition filling, obscuring, or covering the one or more holes.

11. The system of claim 9, wherein the multi-axial manipulator device is further operable to manipulate at least one of: the gas turbine component, the inspection device or the drilling device with respect to a local coordinate system.

12. The system of claim 9, wherein the inspection device comprises at least one camera to receive an image of one or more holes in a gas turbine component.

13. The system of claim 9, wherein the at least one processor is further configured to receive predefined hole position data from manufacturing data associated with the gas turbine component comprising received or previously accessed stored manufacturing data associated with the gas turbine component.

14. The system of claim 9, wherein the at least one processor is further configured to determine at least one missing hole using at least one algorithm to determine hole positions in the gas turbine component.

15. The system of claim 9, wherein the drilling device for removing material from the gas turbine component corresponding to the determined at least one missing hole is further operable to repeat drilling until all determined missing hole locations in the gas turbine component have been drilled.

16. The system of claim 9, wherein the drilling device for removing material from the gas turbine component corresponding to the determined at least one missing hole further comprises using at least one of: laser drilling, mechanical drilling, electron beam drilling, or waterjet or electron discharge machining drilling.

17. An apparatus for locating and drilling a gas turbine component comprising:
   at least one processor in communication with at least one memory module and configured to:
      receive position data associated with one or more holes in a gas turbine component using an inspection device;
      receive predefined hole position data from manufacturing data associated with the gas turbine component;
      determine at least one missing hole, based at least in part on the received position data and the predefined hole position data, wherein determining the at least one missing hole comprises: (i) determining an angle between consecutive holes with respect to an origin point on the gas turbine component, and (ii) determining the at least one missing hole if the angle between the one or more holes with respect to the origin point is greater than the angle between the consecutive holes; and
      position a gas turbine component, an inspection device or a drilling device using a multi-axial manipulator device configured to manipulate at least one of the gas turbine component, the inspection device and the drilling device with respect to a local coordinate system and drill at least one hole in the gas turbine component corresponding to the determined at least one missing hole.

18. The apparatus of claim 17, wherein the at least one processor is further configured to interface with a drilling device for removing material from the gas turbine component corresponding to the determined at least one missing hole wherein the drilling device is operable to repeat drilling until all determined missing hole locations in the gas turbine component have been drilled.

19. The apparatus of claim 17, wherein the at least one processor is further configured to receive predefined hole position data from manufacturing data associated with the gas turbine component comprising receiving or accessing previously stored manufacturing data associated with the gas turbine component.

20. The apparatus of claim 17, wherein the at least one processor is further configured to determine at least one missing hole using at least one algorithm to determine hole positions in the gas turbine component.

* * * * *